US 6,583,967 B2

(12) United States Patent
Kasahara et al.

(10) Patent No.: US 6,583,967 B2
(45) Date of Patent: Jun. 24, 2003

(54) THIN-FILM MAGNETIC HEAD AND METHOD OF MANUFACTURING SAME

(75) Inventors: Noriaki Kasahara, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 191 days.

(21) Appl. No.: 09/879,968

(22) Filed: Jun. 14, 2001

(65) Prior Publication Data

US 2002/0001158 A1 Jan. 3, 2002

(30) Foreign Application Priority Data

Jun. 30, 2000 (JP) ........................................ 2000-198335

(51) Int. Cl.[7] ................................................. G11B 5/39
(52) U.S. Cl. ..................................... 360/321; 360/324.2
(58) Field of Search ............................. 360/324, 324.1, 360/324.2, 321; 29/603.07, 603.14; 428/693; 365/171, 173; 324/207.21

(56) References Cited

U.S. PATENT DOCUMENTS

| 5,159,513 | A  |   | 10/1992 | Dieny et al. | |
|-----------|----|---|---------|--------------|-|
| 6,504,689 | B1 | * | 1/2003  | Gill et al. ................. | 360/324.2 |
| 6,519,124 | B1 | * | 2/2003  | Redon et al. ............. | 360/324.2 |

FOREIGN PATENT DOCUMENTS

| JP | 4-360009   | A |   | 12/1992 | |
|----|------------|---|---|---------|-|
| JP | 5-90026    | A |   | 4/1993  | |
| JP | 5-275769   | A |   | 10/1993 | |
| JP | 8-17020    | A |   | 1/1996  | |
| JP | 8-153310   | A |   | 6/1996  | |
| JP | 9-129445   | A |   | 5/1997  | |
| JP | 10-91921   | A |   | 4/1998  | |
| JP | 11353621   | A | * | 12/1999 | ............ G11B/5/39 |
| JP | 2000113419 | A | * | 4/2000  | ............ G11B/5/39 |
| JP | 2002015407 | A | * | 1/2002  | ............ G11B/5/39 |

* cited by examiner

Primary Examiner—William Klimowicz
(74) Attorney, Agent, or Firm—Oliff & Berridge, PLC (57) ABSTRACT

A thin-film magnetic head includes: a TMR element; a lower electrode layer and an upper electrode layer for feeding a current used for signal detection to the TMR element; and an insulating layer provided between the lower and upper electrode layers and located adjacent to a side of the TMR element. The thin-film magnetic head further includes: an FFG layer that introduces a signal flux to the TMR element, the FFG layer touching one of the top surfaces of the TMR element and extending from the region in which the TMR element is located to the region in which the insulating layer is located; and a base film located between the FFG layer and the insulating layer and used as a base when the FFG layer is formed.

14 Claims, 9 Drawing Sheets

THIN-FILM MAGNETIC HEAD AND METHOD OF MANUFACTURING SAME

BACKGROUND OF THE INVENTION

1. Field of the Invention

The present invention relates to a thin-film magnetic head that utilizes a magnetoresistive element for reading the magnetic field intensity of a magnetic recording medium, for example, as a signal, and to a method of manufacturing such a thin-film magnetic head.

2. Description of the Related Art

Performance improvements in thin-film magnetic heads have been sought as recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading that detects a magnetic field through the use of the magnetoresistive effect.

Read heads that exhibit high sensitivity and produce high outputs have been required. In response to such demands, attention has been focused on tunnel magnetoresistive elements (that may be hereinafter called TMR elements) that detect a magnetic field through the use of the tunnel magnetoresistive effect.

The TMR element has a structure in which a lower magnetic layer, a tunnel barrier layer and an upper magnetic layer are stacked on a substrate. Each of the lower magnetic layer and the upper magnetic layer includes a ferromagnetic substance. In general, the magnetic layer closer to the substrate is called the lower magnetic layer and the magnetic layer farther from the substrate is called the upper magnetic layer. Therefore, the terms 'upper' and 'lower' of the upper and lower magnetic layers do not always correspond to the position in the arrangement of an actual TMR element.

The tunnel barrier layer is a layer made of a thin nonmagnetic insulating film through which electrons are capable of passing while maintaining spins thereof by means of the tunnel effect, that is, through which a tunnel current is allowed to pass. The tunnel magnetoresistive effect is a phenomenon that, when a current is fed to a pair of magnetic layers sandwiching the tunnel barrier layer, a tunnel current passing through the tunnel barrier layer changes, depending on the relative angle between magnetizations of the two magnetic layers. If the relative angle between magnetizations of the magnetic layers is small, the tunneling rate is high. As a result, the resistance to the current passing across the magnetic layers is reduced. If the relative angle between magnetizations of the magnetic layers is large, the tunneling rate is low. The resistance to the current passing across the magnetic layers is therefore increased.

With regard to the structure of a thin-film magnetic head incorporating a TMR element, if the tunnel barrier layer made up of a thin insulating layer is exposed from the medium facing surface that faces toward a recording medium, a short circuit may occur between the two magnetic layers opposed to each other with the tunnel barrier layer in between, during or after lapping of the medium facing surface. Such a structure is therefore not preferred.

To cope with such a problem, the inventors including the inventors of the present application disclose a thin-film magnetic head in U.S. patent application Ser. No. 09/517, 580. This head has a structure in which a TMR element retreats from the medium facing surface, and a soft magnetic layer is provided for introducing a signal magnetic flux to the TMR element. The soft magnetic layer extends from the medium facing surface to the point in which the TMR element is located. In the present application this soft magnetic layer is called a front flux guide (FFG) and the thin-film magnetic head having the above-described structure is called an FFG-type TMR head. It is impossible that the TMR element incorporated in the FFG-type TMR head is lapped when the distance between the medium facing surface and the TMR element is controlled by lapping the medium facing surface. Therefore, the FFG-type TMR head has a feature that the medium facing surface of the head is defined by mechanical lapping without creating a short circuit between the two magnetic layers.

Reference is now made to FIG. 18 to FIG. 23 to describe an example of method of manufacturing the FFG-type TMR head. FIG. 18 to FIG. 23 are cross sections that illustrate steps of the method.

Figure 18:
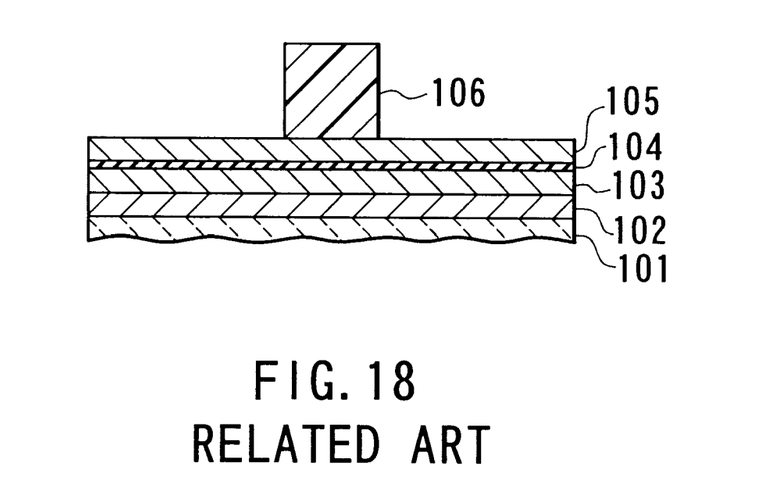
FIG. 18 is a cross-sectional view that illustrates a step in an example of method of manufacturing the FFG-type TMR head.

In this method, as shown in FIG. 18, a lower electrode layer 102 is formed on a substrate 101. Next, a lower magnetic layer 103, a tunnel barrier layer 104 and an upper magnetic layer 105 are stacked on the lower electrode layer 102 one by one. Next, a resist mask 106 used for patterning the TMR element is formed by photolithography on the upper magnetic layer 105.

Figure 19:
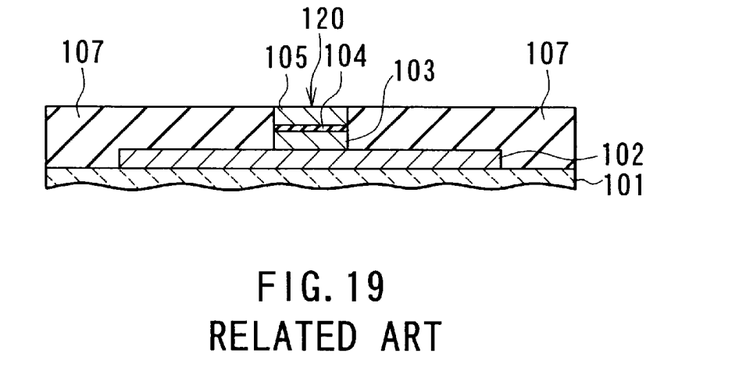
FIG. 19 illustrates a step that follows FIG. 18.

Next, the upper magnetic layer 105, the tunnel barrier layer 104 and the lower magnetic layer 103 are selectively etched through ion milling, for example, using the resist mask 106. The TMR element 120 made up of the lower magnetic layer 103, the tunnel barrier layer 104 and the upper magnetic layer 105 that are patterned is thus formed, as shown in FIG. 19. Next, an insulating layer 107 is formed around the TMR element 120 through liftoff. That is, the insulating layer 107 is formed over the entire surface while the resist mask 106 is left. The resist mask 106 is then removed.

Figure 20:
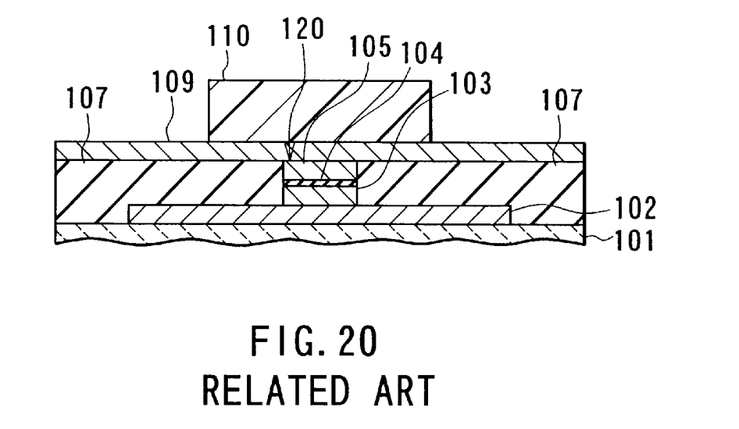
FIG. 20 illustrates a step that follows FIG. 19.

Next, as shown in FIG. 20, an FFG layer 109 made of a soft magnetic material is formed on the upper magnetic layer 105 and the insulating layer 107. Next, a resist mask 110 used for patterning the FFG layer 109 is formed by photolithography on the FFG layer 109.

Figure 21:
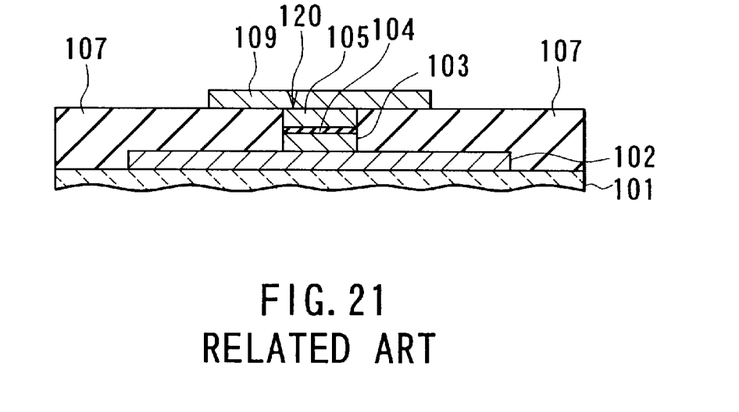
FIG. 21 illustrates a step that follows FIG. 20.

Next, as shown in FIG. 21, the FFG layer 109 is selectively etched through ion milling, for example, using the resist mask 110. The FFG layer 109 is thereby patterned. The FFG layer 109 patterned is T-shaped and has a portion extending from the portion above the upper magnetic layer 105 toward the medium facing surface, and two portions extending from the portion above the upper magnetic layer 105 toward both sides in the direction parallel to the medium facing surface. The resist mask 110 is then removed.

Figure 22:
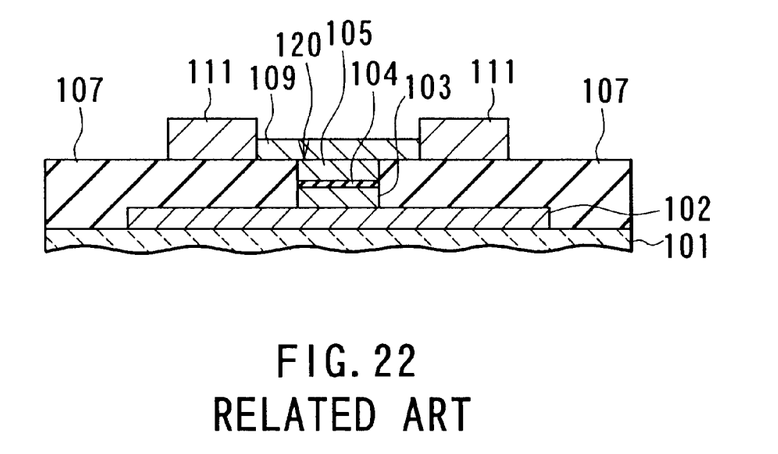
FIG. 22 illustrates a step that follows FIG. 21.

Next, as shown in FIG. 22, hard magnetic layers 111 for applying a bias magnetic field to the TMR element 120 are formed on outer sides of the two portions of the FFG layer 109 extending toward both sides in the direction parallel to the medium facing surface.

Figure 23:
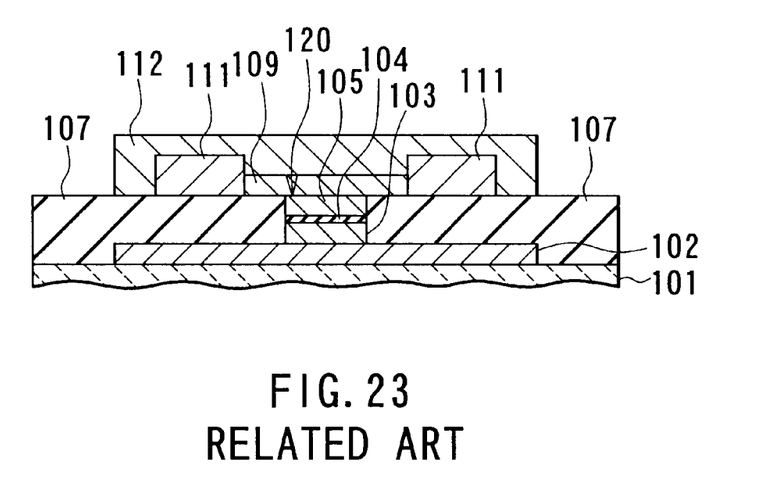
FIG. 23 illustrates a step that follows FIG. 22.

Next, as shown in FIG. 23, an upper electrode layer 112 is formed on the FFG layer 109 and the hard magnetic layer 111. Through the foregoing steps, the TMR element 120 of the FFG-type TMR head and its periphery are formed.

Next, the medium facing surface of the head is defined by lapping. Through this lapping the FFG layer 109 is exposed from the medium facing surface and the distance from the medium facing surface to the TMR element 120 is controlled.

The FFG as described above is not limited to a TMR head but may be applied to an MR head having a structure that is disclosed in Published Unexamined Japanese Patent Application Heisei 5-275769 (1993), that is, a structure in which a sense current used for signal detection is fed to the MR element in the direction perpendicular to the film surface of the MR element. Such a structure is called a current perpendicular to plane (CPP) structure in the present application. The structure of the TMR head is included in the CPP structure.

One type of CPP-structure MR head incorporates a multilayer magnetic film made up of a plurality of magnetic layers stacked with nonmagnetic layers in between, in place of the lower magnetic layer 103, the tunnel barrier layer 104 and the upper magnetic layer 105 of FIG. 23. This multilayer magnetic film has a property that the RKKY interaction occurs between the magnetic layers and the directions of magnetization of the magnetic layers are thereby made antiparallel when the material and the thickness of the nonmagnetic layers are suitably chosen. The multilayer magnetic film thus exhibits the giant magnetoresistive (GMR) effect. Such a multilayer magnetic film is disclosed in Published Unexamined Japanese Patent Application Heisei 4-360009 (1992), Published Unexamined Japanese Patent Application Heisei 9-129445 (1997) and Published Unexamined Japanese Patent Application Heisei 5-90026 (1993), for example. The multilayer magnetic film is called an antiferromagnetic coupling-type multilayer magnetic film in the present application. The CPP-structure GMR head incorporating an antiferromagnetic coupling-type multilayer magnetic film, such as the one disclosed in Published Unexamined Japanese Patent Application Heisei 5-275769, is called a CPP-structure GMR head in the present application.

In place of the antiferromagnetic coupling-type multilayer magnetic film mentioned above, it is possible to utilize a spin-valve-type multilayer magnetic film that is disclosed in U.S. Pat. No. 5,159,513. The spin-valve-type multilayer magnetic film may be a dual-spin-valve-type multilayer magnetic film that is disclosed in Published Unexamined Japanese Patent Application Heisei 10-91921 (1998).

When an areal recording density greater than 100 gigabits per square inch is implemented, even a head incorporating a TMR element is not capable of producing a sufficient output and a sufficient signal-to-noise (S/N) ratio. The CPP-structure GMR head as mentioned above is therefore required.

According to the method of manufacturing the FFG-type TMR head illustrated in FIG. 18 to FIG. 23, the FFG layer 109 is required to be formed on the integrated surface of the TMR element. In this case, as shown in FIG. 20, the top surface of the upper magnetic layer 105 of the TMR element occupies an only small portion of the surface on which the FFG layer 109 is formed while the greater part of this surface is the top surface of the insulating layer 107. Therefore, the FFG layer 109 is almost directly formed on the insulating layer 107.

However, when the FFG layer 109 is directly formed on the insulating layer 107, the soft magnetic property of the FFG layer 109 is reduced. As a result, a problem that a read output of the head to be obtained is insufficient thereby results. The reason is considered to be a bad orientation of the FFG layer 109 directly formed on the insulating layer 107.

In Published Unexamined Japanese Patent Application Heisei 8-153310 (1996), a technique is disclosed for making a flux guide layer on a base layer of Ta or Cr, for example, that is formed on the magnetic layer having the magnetoresistive effect. It is thus possible that the FFG layer 109 is formed on a base layer that is formed on the upper magnetic layer 105 and the insulating layer 107 in the FFG-type TMR head, too.

However, if the FFG layer 109 is formed on a base layer made of a nonmagnetic material such as Ta or Cr that is formed on the upper magnetic layer 105, the following problem results. It is required that the upper magnetic layer 105 is magnetically coupled to the FFG layer 109, so that the magnetic flux that enters from the FFG layer 109 during operation is efficiently brought to the upper magnetic layer 105. However, it is impossible that the upper magnetic layer 105 is magnetically coupled to the FFG layer 109 if the FFG layer 109 is formed on the base layer made of a nonmagnetic material that is formed on the upper magnetic layer 105. It is therefore impossible that the FFG layer 109 fully exhibits its function.

The foregoing problem similarly applies to the case in which the FFG layer is provided in a CPP-structure GMR head.

OBJECT AND SUMMARY OF THE INVENTION

It is an object of the invention to provide a thin-film magnetic head comprising a magnetoresistive element and a soft magnetic layer that introduces a signal flux to the magnetoresistive element, and a method of manufacturing such a thin-film magnetic head for improving the soft magnetic property of the soft magnetic layer and improving the output of the head.

A thin-film magnetic head of the invention comprises: a magnetoresistive element having two surfaces that face toward opposite directions and a side portion that connects the two surfaces to each other; a first electrode layer and a second electrode layer each of which is directly or indirectly connected to each of the surfaces of the magnetoresistive element and provided for feeding a current used for signal detection to the magnetoresistive element; an insulating layer provided between the first and second electrode layers and located adjacent to the side portion of the magnetoresistive element; a soft magnetic layer introducing a signal magnetic flux to the magnetoresistive element, the soft magnetic layer touching one of the surfaces of the magnetoresistive element and extending from a region in which the magnetoresistive element is located to a region in which the insulating layer is located; and a base film located between the soft magnetic layer and the insulating layer and used as a base when the soft magnetic layer is formed.

A method of the invention is provided for manufacturing a thin-film magnetic head comprising: a magnetoresistive element having two surfaces that face toward opposite directions and a side portion that connects the two surfaces to each other; a first electrode layer and a second electrode layer each of which is directly or indirectly connected to each of the surfaces of the magnetoresistive element and provided for feeding a current used for signal detection to the magnetoresistive element; an insulating layer provided between the first and second electrode layers and located adjacent to the side portion of the magnetoresistive element; and a soft magnetic layer introducing a signal magnetic flux to the magnetoresistive element, the soft magnetic layer touching one of the surfaces of the magnetoresistive element and extending from a region in which the magnetoresistive element is located to a region in which the insulating layer is located. The method includes the steps of: forming the first electrode layer; forming the magnetoresistive element and the insulating layer on the first electrode layer; forming a base film on the insulating layer, the base film being used as a base when the soft magnetic layer is formed; forming the soft magnetic layer on the base film and the magnetoresistive element; and forming the second electrode layer on the soft magnetic layer.

According to the thin-film magnetic head or the method of manufacturing the same of the invention, the soft magnetic layer is formed on the base film that is formed on the insulating layer while the base film is not located between the magnetoresistive element and the soft magnetic layer.

According to the thin-film magnetic head or the method of the invention, the base film may be made of a nonmagnetic metal material. In this case, the nonmagnetic metal material may include Cr or NiCr.

According to the thin-film magnetic head or the method of the invention, the magnetoresistive element may incorporate a tunnel barrier layer and two magnetic layers opposed to each other, the tunnel barrier layer being located between the magnetic layers.

According to the thin-film magnetic head or the method of the invention, the magnetoresistive element may incorporate an antiferromagnetic coupling-type multilayer magnetic film.

According to the thin-film magnetic head or the method of the invention, the magnetoresistive element may incorporate a spin-valve-type multilayer magnetic film. The spin-valve-type multilayer magnetic film may be a dual-spin-valve-type multilayer magnetic film.

According to the thin-film magnetic head or the method of the invention, the soft magnetic layer may be made up of a plurality of layers.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

First Embodiment

A thin-film magnetic head and a method of manufacturing the same of a first embodiment of the invention will now be described. FIG. 1A to FIG. 6A and FIG. 1B to FIG. 6B illustrate steps of the method of the embodiment. FIG. 1A to FIG. 6A are cross sections of the head that are taken across the region in which a TMR element is located and that are parallel to the medium facing surface that faces toward a recording medium. FIG. 1B to FIG. 6B illustrate integrated surfaces (top surfaces).

Figure 1A:
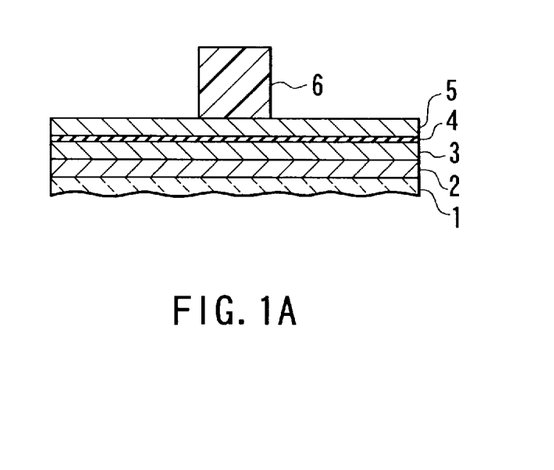
FIG. 1A and FIG. 1B illustrate a step in a method of manufacturing a thin-film magnetic head of a first embodiment of the invention.
Figure 1B:
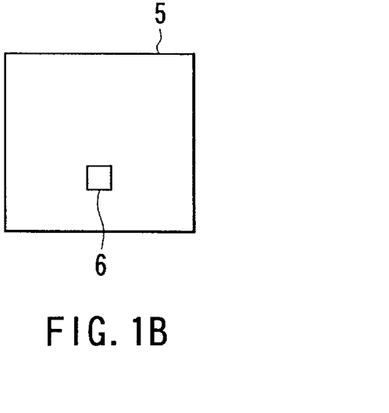

In this method, as shown in FIG. 1A and FIG. 1B, a lower electrode layer 2 is formed on a substrate 1. Next, a lower magnetic layer 3, a tunnel barrier layer 4 and an upper magnetic layer 5 are stacked on the lower electrode layer 2 one by one. Next, a resist mask 6 used for patterning a TMR element is formed by photolithography on the upper magnetic layer 5.

Figure 2A:
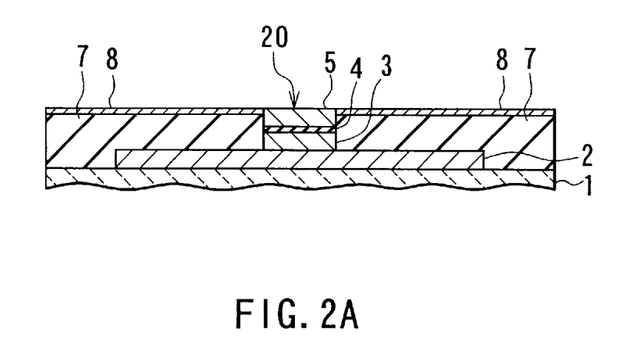
FIG. 2A and FIG. 2B illustrate a step that follows FIG. 1A and FIG. 1B.
Figure 2B:
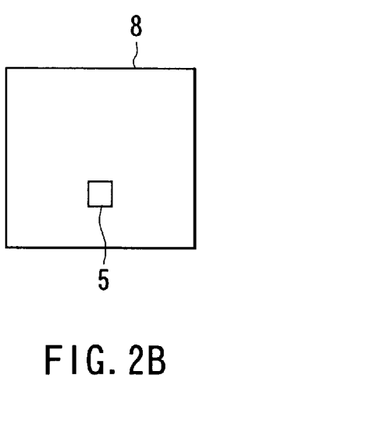

Next, the upper magnetic layer 5, the tunnel barrier layer 4 and the lower magnetic layer 3 are selectively etched through ion milling, for example, using the resist mask 6. The TMR element 20 made up of the lower magnetic layer 3, the tunnel barrier layer 4 and the upper magnetic layer 5 that are patterned is thus formed, as shown in FIG. 2A and FIG. 2B. Next, an insulating layer 7 and a base film 8 are formed around the TMR element 20 through liftoff. That is, the insulating layer 7 is formed over the entire surface through sputtering while the resist mask 6 is left. Furthermore, the base film 8 is formed on the insulating layer 7. The resist mask 6 is then removed. The base film 8 is a film made of a nonmagnetic metal material to be the base of an FFG layer 9 that will be described later. The base film 8 is provided for improving the orientation of the FFG layer 9 when the FFG layer 9 is formed. The nonmagnetic metal material used for the base film 8 is preferably Cr or NiCr.

It is preferred that an amount of etching is monitored when the upper magnetic layer 5, the tunnel barrier layer 4 and the lower magnetic layer 3 are etched, and the thicknesses of the insulating layer 7 and the base film 8 are controlled when these layers 7 and 8 are formed, so that the top surface of the base film 8 and the top surface of the upper magnetic layer 5 are located in one plane, as shown in FIG. 2A and FIG. 2B.

Figure 3A:
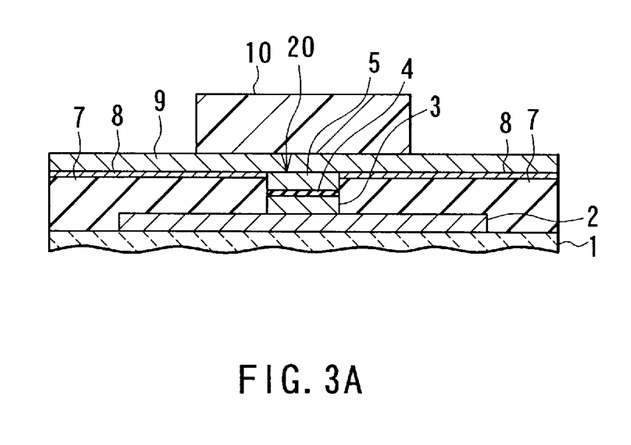
FIG. 3A and FIG. 3B illustrate a step that follows FIG. 2A and FIG. 2B.
Figure 3B:
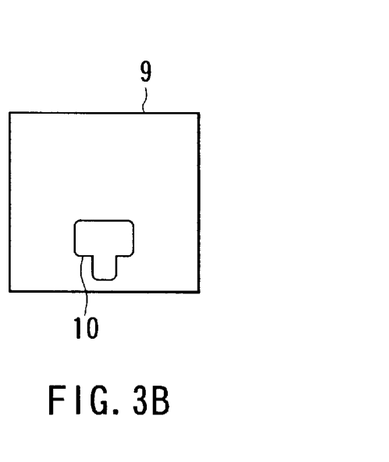

Next, as shown in FIG. 3A and FIG. 3B, the FFG layer 9 made of a soft magnetic material such as NiFe or NiFeTa is formed on the upper magnetic layer 5 and the base film 8. Next, a resist mask 10 used for patterning the FFG layer 9 is formed by photolithography on the FFG layer 9.

Figure 4A:
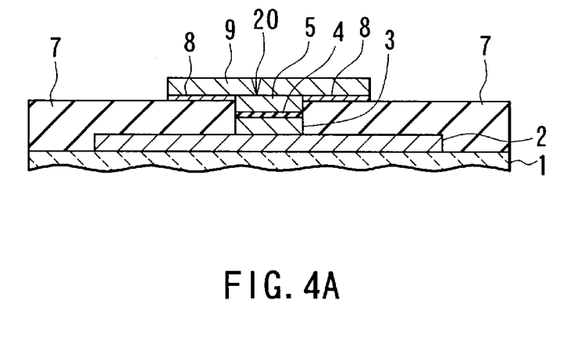
FIG. 4A and FIG. 4B illustrate a step that follows FIG. 3A and FIG. 3B.
Figure 4B:
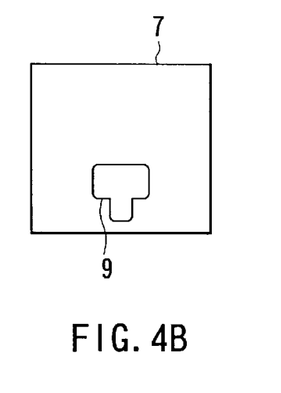

Next, as shown in FIG. 4A and FIG. 4B, the FFG layer 9 and the base film 8 are selectively etched through ion milling, for example, using the resist mask 10. The FFG layer 9 and the base film 8 are thereby patterned. The FFG layer 9 patterned is T-shaped and has a portion extending from the portion above the upper magnetic layer 5 toward the medium facing surface, and two portions extending from the portion above the upper magnetic layer 5 toward both sides in the direction parallel to the medium facing surface. The resist mask 10 is then removed.

Figure 5A:
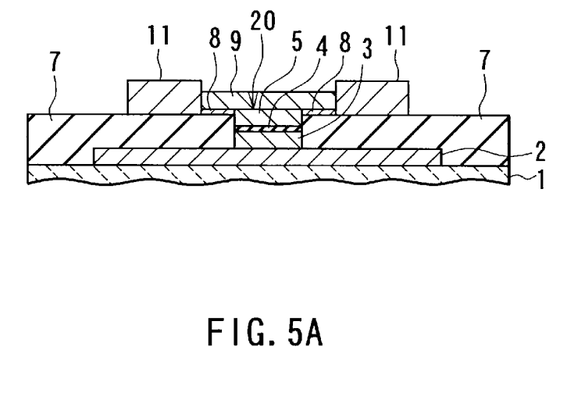
FIG. 5A and FIG. 5B illustrate a step that follows FIG. 4A and FIG. 4B.
Figure 5B:
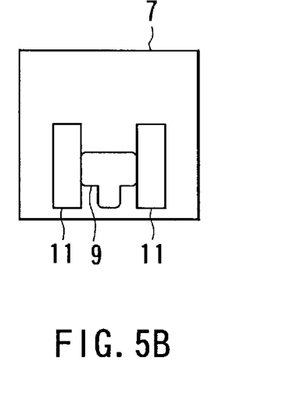

Next, as shown in FIG. 5A and FIG. 5B, hard magnetic layers 11 for applying a bias magnetic field to the TMR element 20 are formed on outer sides of the two portions of the FFG layer 9 extending toward both sides in the direction parallel to the medium facing surface.

Figure 6A:
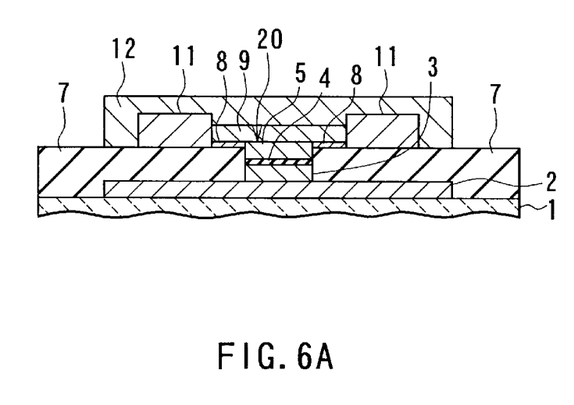
FIG. 6A and FIG. 6B illustrate a step that follows FIG. 5A and FIG. 5B.
Figure 6B:
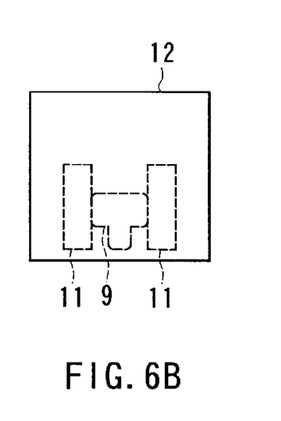

Next, as shown in FIG. 6A and FIG. 6B, an upper electrode layer 12 is formed on the FFG layer 9 and the hard magnetic layers 11. Through the foregoing steps, the TMR element 20 of the thin-film magnetic head of this embodiment and its periphery are formed.

If the head is a composite thin-film magnetic head comprising a read head and a write head, an induction-type electromagnetic transducer for writing is formed in the following step. This transducer incorporates: a first magnetic layer and a second magnetic layer magnetically coupled to each other and including magnetic pole portions that are opposed to each other and placed in regions of the magnetic layers on a side of the medium facing surface that faces toward a recording medium, each of the magnetic layers including at least one layer; a write gap layer provided between the pole portions of the first and second magnetic layers; and a thin-film coil at least a part of which is placed between the first and second magnetic layers, the at least part of the coil being insulated from the first and second magnetic layers. A detailed description of manufacturing steps of the induction-type electromagnetic transducer and accompanying drawings are omitted.

Next, the medium facing surface of the head is defined by lapping the bottom surface of FIG. 6B. Through this lapping the FFG layer 9 is exposed from the medium facing surface and the distance from the medium facing surface to the TMR element 20 is controlled.

As shown in FIG. 6A and FIG. 6B, the thin-film magnetic head of this embodiment comprises: the TMR element 20 (made up of the lower magnetic layer 3, the tunnel barrier layer 4 and the upper magnetic layer 5) having the two surfaces facing toward opposite directions and having the side portions that connect the two surfaces to each other; the lower electrode layer 2 and the upper electrode layer 12 each of which is directly or indirectly connected to each of the surfaces of the TMR element 20 and provided for feeding a current used for signal detection to the TMR element 20; and the insulating layer 7 provided between the lower electrode layer 2 and the upper electrode layer 12 and located adjacent to the side portions of the TMR element 20. The thin-film magnetic head further comprises: the FFG layer 9 as a soft magnetic layer that introduces a signal flux to the TMR element 20, the FFG layer 9 touching one of the surfaces (the top surface) of the TMR element 20 and extending from the region in which the TMR element 20 is located to the region in which the insulating layer 7 is located; and the base film 8 located between the FFG layer 9 and the insulating layer 7 and used as a base when the FFG layer 9 is formed.

According to the thin-film magnetic head of the embodiment, the lower electrode layer 2 and the upper electrode layer 12 supply a current used for signal detection to the TMR element 20. The FFG layer 9 introduces a signal flux generated by data written on a magnetic recording medium to the TMR element 20. The TMR element 20 detects a signal corresponding to the signal flux.

According to the embodiment, the base film 8 is formed on the insulating layer 7, and the FFG layer 9 is formed on the base film 8. As a result, the orientation of the FFG layer 9 is better than the case in which the FFG layer 9 is directly formed on the insulating layer 7. The soft magnetic property of the FFG layer 9 is therefore improved.

In addition, according to the embodiment, the base film 8 is not located between the upper magnetic layer 5 and the FFG layer 9. As a result, the upper magnetic layer 5 is magnetically coupled to the FFG layer 9.

Owing to the foregoing features of the embodiment, the output of the thin-film magnetic head is improved.

The following is a description of an example of result of experiment in which head outputs were compared between the thin-film magnetic heads of the embodiment of the invention and a thin-film magnetic head of reference example in which the FFG layer 9 was directly formed on the insulating layer 7.

Figure 7:
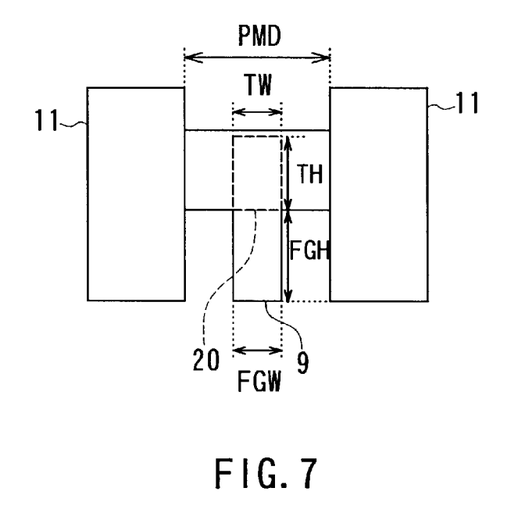
FIG. 7 illustrates some of the components of the thin-film magnetic head of the first embodiment.

Reference is now made to FIG. 7 to describe the parameters used in the following description. FIG. 7 illustrates the TMR element 20, the FFG layer 9 and the hard magnetic layers 11 among the components making up the thin-film magnetic head. In FIG. 7 the flux guide height (FGH) is the distance between the medium facing surface and an end of the TMR element 20 closer to the medium facing surface. The flux guide width (FGW) is the width of the portion of the FFG layer 9 that extends from the portion above the TMR element 20 toward the medium facing surface. The permanent magnet distance (PMD) is the length of the portion of the FFG layer 9 that extends from the portion above the TMR element 20 toward both sides in the direction parallel to the medium facing surface. The track height (TH) is the length of the TMR element 20 orthogonal to the medium facing surface. The track width (TW) is the length of the TMR element 20 parallel to the medium facing surface.

Figure 8:
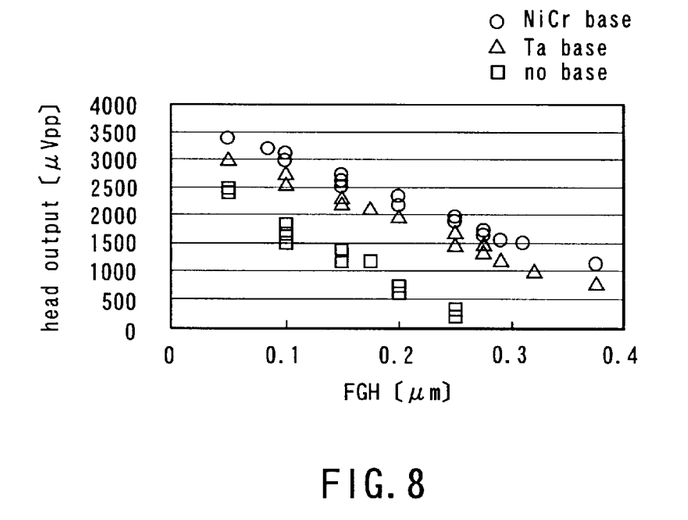
FIG. 8 is a plot showing an example of experiment result in which head outputs were compared between the thin-film magnetic heads of the first embodiment of the invention and a thin-film magnetic head of reference example.

FIG. 8 shows the example of result in which the relationship between the FGH and head outputs was obtained with regard to the thin-film magnetic head of the embodiment of the invention in which the base film 8 was made of NiCr, the thin-film magnetic head of the embodiment in which the base film 8 was made of Ta, and the thin-film magnetic head of reference example in which the FFG layer 9 was directly formed on the insulating layer 7.

The TMR element 20 of each of the heads used in the experiment was made up of a 5-nm-thick Ta layer, a 2-nm-thick NiFe layer, a 30-nm-thick PtMn layer, a 3-nm-thick CoFe layer, a 0.7-nm-thick $Al_2O_3$ layer, a 2-nm-thick CoFe layer, and a 5-nm-thick NiFe layer that were stacked in this order on the lower electrode layer 2. The FFG layer 9 of each of the heads used in the experiment was made up of a 4-nm-thick NiFe layer and a 3-nm-thick Ta layer that were stacked in this order on the upper magnetic layer 5.

With regard to each of the heads used in the experiment, the parameters other than the FGH were: FGW=0.6 µm, PMD=0.8 µm, TH=0.6 µm, and TW=0.6 µm.

As shown in FIG. 8, it is noted that the thin-film magnetic heads of the embodiment of the invention exhibited better head outputs, compared to the thin-film magnetic head in which the FFG layer 9 was directly formed on the insulating layer 7.

Second Embodiment

A thin-film magnetic head and a method of manufacturing the same of a second embodiment of the invention will now be described. FIG. 9A to FIG. 14A and FIG. 9B to FIG. 14B illustrate steps of the method of the embodiment. FIG. 9A to FIG. 14A are cross sections of the head that are taken across the region in which a TMR element is located and that are parallel to the medium facing surface. FIG. 9B to FIG. 14B illustrate integrated surfaces (top surfaces).

The steps of the method of the second embodiment that are performed until the TMR element 20 made up of the lower magnetic layer 3, the tunnel barrier layer 4 and the upper magnetic layer 5 that are patterned is formed are similar to the steps of the first embodiment.

In the following step of the second embodiment, the insulating layer 7 and a first base film 21 are formed around the TMR element 20 through liftoff. The first base film 21 is a film made of a nonmagnetic metal material to be the base of a first FFG layer 22 that will be described later. The first base film 21 is provided for improving the orientation of the first FFG layer 22 when the FFG layer 22 is formed. The nonmagnetic metal material used for the first base film 21 is preferably Cr or NiCr.

Figure 9A:
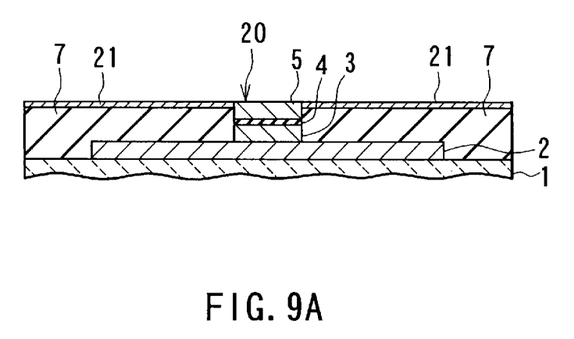
FIG. 9A and FIG. 9B illustrate a step in a method of manufacturing a thin-film magnetic head of a second embodiment of the invention.
Figure 9B:
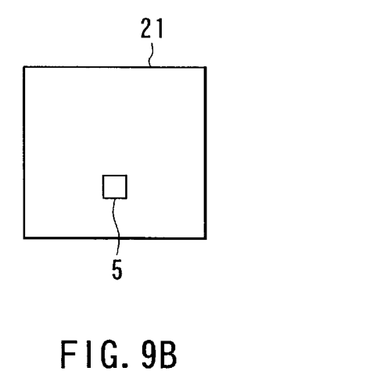

As in the first embodiment, it is preferred that an amount of etching is monitored when the upper magnetic layer 5, the tunnel barrier layer 4 and the lower magnetic layer 3 are etched, and the thicknesses of the insulating layer 7 and the base film 21 are controlled when these layers 7 and 21 are formed, so that the top surface of the base film 21 and the top surface of the upper magnetic layer 5 are located in one plane, as shown in FIG. 9A and FIG. 9B.

Figure 10A:
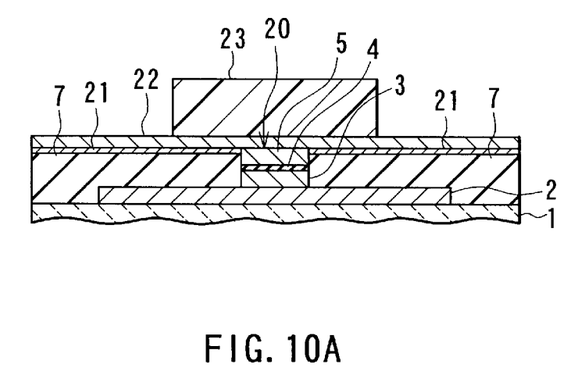
FIG. 10A and FIG. 10B illustrate a step that follows FIG. 9A and FIG. 9B.
Figure 10B:
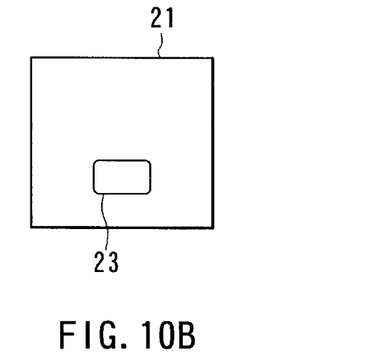

Next, as shown in FIG. 10A and FIG. 10B, the first FFG layer 22 made of a soft magnetic material such as NiFe or NiFeTa is formed on the upper magnetic layer 5 and the first base film 21. Next, a resist mask 23 used for patterning the first FFG layer 22 is formed by photolithography on the first FFG layer 22.

Figure 11A:
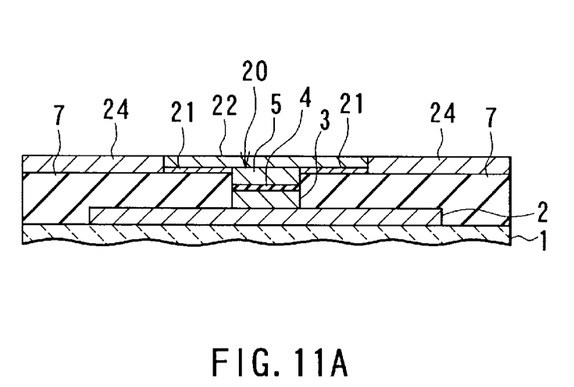
FIG. 11A and FIG. 11B illustrate a step that follows FIG. 10A and FIG. 10B.
Figure 11B:
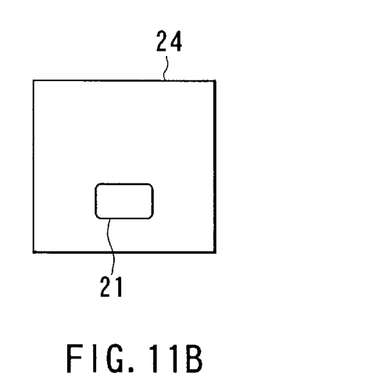

Next, as shown in FIG. 11A and FIG. 11B, the first FFG layer 22 and the base film 21 are selectively etched through ion milling, for example, using the resist mask 23. The first FFG layer 22 and the base film 21 are thereby patterned. The first FFG layer 22 patterned is nearly rectangle-shaped and extends from the portion above the upper magnetic layer 5 toward both sides in the direction parallel to the medium facing surface.

Next, a second base film 24 is formed through liftoff on the insulating layer 7 located around the first FFG layer 22. That is, the second base film 24 is formed through sputtering while the resist mask 23 is left. The resist mask 23 is removed thereafter. The second base film 24 is a film made of a nonmagnetic metal material to be the base of a second FFG layer 25 that will be described later. The second base film 24 is provided for improving the orientation of the second FFG layer 25 when the FFG layer 25 is formed. The nonmagnetic metal material used for the second base film 24 is preferably Cr or NiCr.

It is preferred that an amount of etching is monitored when the first FFG layer 22 and the first base film 21 are etched, and the thickness of the second base film 24 is controlled when the base film 24 is formed, so that the top surface of the second base film 24 and the top surface of the first FFG layer 22 are located in one plane, as shown in FIG. 11A and FIG. 11B.

Figure 12A:
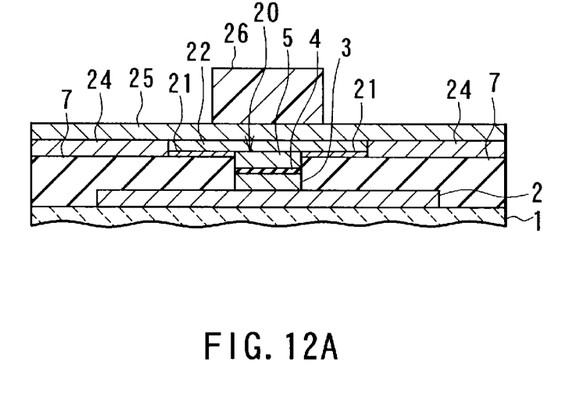
FIG. 12A and FIG. 12B illustrate a step that follows FIG. 11A and FIG. 11B.
Figure 12B:
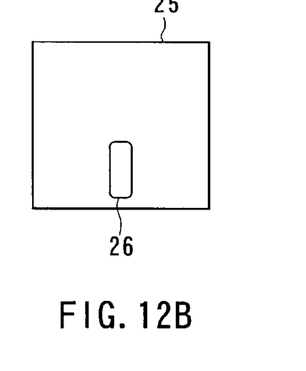

Next, as shown in FIG. 12A and FIG. 12B, the second FFG layer 25 made of a soft magnetic material such as NiFe or NiFeTa is formed on the first FFG layer 22 and the second base film 24. Next, a resist mask 26 used for patterning the second FFG layer 25 is formed by photolithography on the second FFG layer 25.

Figure 13A:
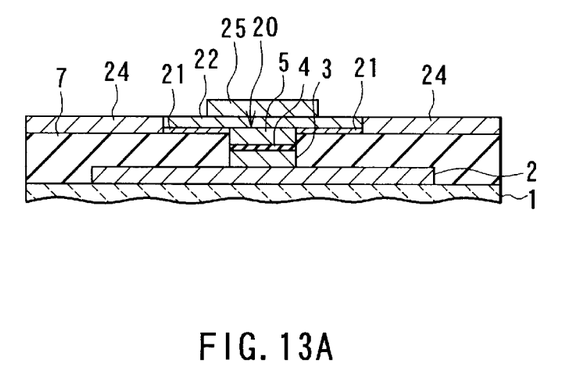
FIG. 13A and FIG. 13B illustrate a step that follows FIG. 12A and FIG. 12B.
Figure 13B:
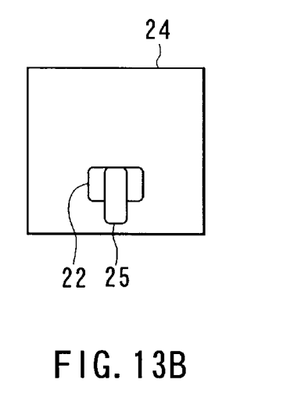

Next, as shown in FIG. 13A and FIG. 13B, the second FFG layer 25 is selectively etched through ion milling, for example, using the resist mask 26. The second FFG layer 25 is thereby patterned. The second FFG layer 25 patterned is nearly rectangle-shaped and extends from the portion above the upper magnetic layer 5 toward the medium facing surface.

As shown in FIG. 13B, the two layers including the first FFG layer 22 and the second FFG layer 25 form a T-shaped FFG layer having the portion extending from the portion above the upper magnetic layer 5 toward the medium facing surface, and the two portions extending from the portion above the upper magnetic layer 5 toward both sides in the direction parallel to the medium facing surface. The first FFG layer 22 includes the two portions that extend toward both sides in the direction parallel to the medium facing surface. The second FFG layer 25 includes the portion that extend toward the medium facing surface.

Figure 14A:
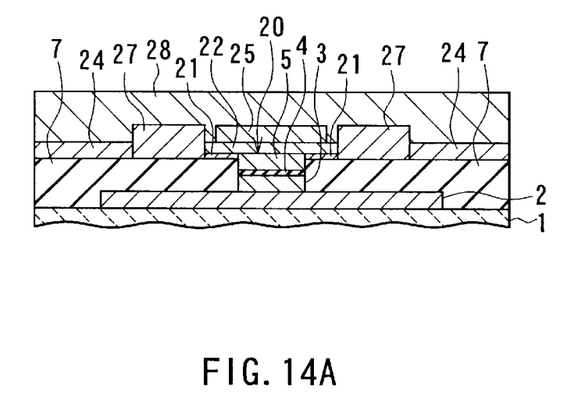
FIG. 14A and FIG. 14B illustrate a step that follows FIG. 13A and FIG. 13B.
Figure 14B:
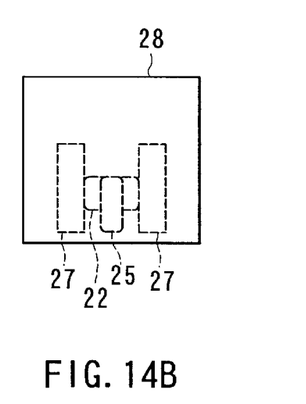

Next, as shown in FIG. 14A and FIG. 14B, portions of the second base film 24 are etched. These portions etched are located on outer sides of the two portions of the first FFG layer 22 that extend toward both sides in the direction parallel to the medium facing surface. Hard magnetic layers 27 for applying a bias magnetic field to the TMR element 20 are formed in these portions etched.

Next, an upper electrode layer 28 is formed over the entire surface. Through the foregoing steps, the TMR element 20 of the thin-film magnetic head of this embodiment and its periphery are formed.

If the head is a composite thin-film magnetic head comprising a read head and a write head, an induction-type electromagnetic transducer for writing is formed in the following step, as in the first embodiment.

Next, the medium facing surface of the head is defined by lapping the bottom surface of FIG. 14B. Through this lapping the second FFG layer 25 is exposed from the medium facing surface and the distance from the medium facing surface to the TMR element 20 is controlled.

As shown in FIG. 14A and FIG. 14B, the thin-film magnetic head of the second embodiment has a configuration similar to that of the thin-film magnetic head of the first embodiment, except that the FFG layer is made up of the two layers 22 and 25 in the head of the second embodiment.

According to the second embodiment, the first base film 21 is formed on the insulating layer 7, and the first FFG layer 22 is formed on the first base film 21. In addition, the second base film 24 is formed on the insulating layer 7, and the second FFG layer 25 is formed on the second base film 24. As a result, the orientation of the first FFG layer 22 and the second FFG layer 25 is better than the case in which the FFG layers 22 and 25 are directly formed on the insulating layer 7. The soft magnetic property of the FFG layer made up of the two layers 22 and 25 is therefore improved.

In addition, according to the embodiment, the base films 21 and 24 are not located between the upper magnetic layer 5 of the TMR element 20 and the FFG layer. As a result, the upper magnetic layer 5 is magnetically coupled to the FFG layer.

Owing to the foregoing features of the embodiment, the output of the thin-film magnetic head is improved.

The following is a description of an example of result of experiment in which head outputs were compared between the thin-film magnetic heads of the second embodiment of the invention and a thin-film magnetic head of reference example in which the FFG layer was directly formed on the insulating layer 7. The parameters used in the following description are similar to those of the first embodiment.

Figure 15:
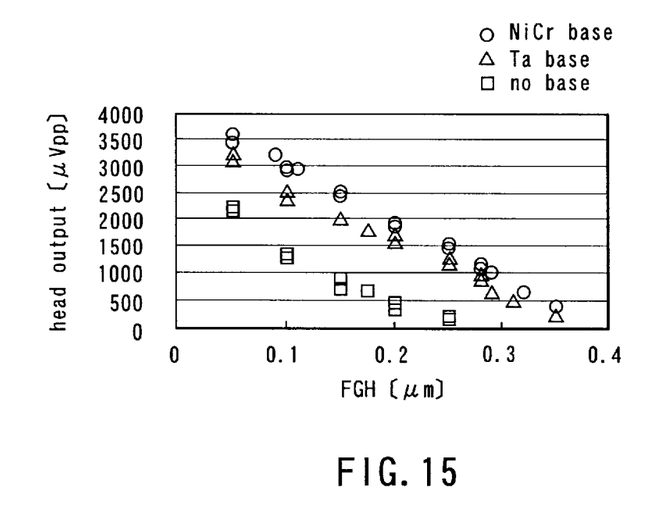
FIG. 15 is a plot showing an example of experiment result in which head outputs were compared between the thin-film magnetic heads of the second embodiment of the invention and a thin-film magnetic head of reference example.

FIG. 15 shows the example of result in which the relationship between the FGH and head outputs was obtained with regard to the thin-film magnetic head of the embodiment of the invention in which the base films 21 and 24 were made of NiCr, the thin-film magnetic head of the embodiment in which the base films 21 and 24 were made of Ta, and the thin-film magnetic head of reference example in which the FFG layer was directly formed on the insulating layer 7.

The TMR element 20 of each of the heads used in the experiment was made up of a 5-nm-thick Ta layer, a 2-nm-thick NiFe layer, a 30-nm-thick PtMn layer, a 3-nm-thick CoFe layer, a 0.7-nm-thick $Al_2O_3$ layer, a 2-nm-thick CoFe layer, and a 5-nm-thick NiFe layer that were stacked in this order on the lower electrode layer 2. Each of the first FFG layer 22 and the second FFG layer 25 of each of the heads used in the experiment was made up of a 40-nm-thick NiFeTa layer and a 30-nm-thick Ta layer that were stacked in this order on the upper magnetic layer 5.

With regard to each of the heads used in the experiment, the parameters other than the FGH were: FGW 0.35 μm, PMD=0.5 μm, TH=0.4 μm, and TW=0.4 μm.

As shown in FIG. 15, it is noted that the thin-film magnetic heads of the embodiment of the invention exhibited better head outputs, compared to the thin-film magnetic head in which the FFG layer was directly formed on the insulating layer 7.

The remainder of the configuration, functions and effects of the second embodiment are similar to those of the first embodiment.

Third Embodiment

Figure 16A:
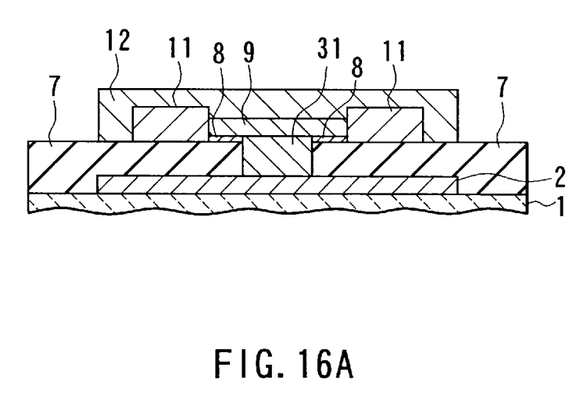
FIG. 16A and FIG. 16B illustrate the configuration of a thin-film magnetic head of a third embodiment of the invention.
Figure 16B:
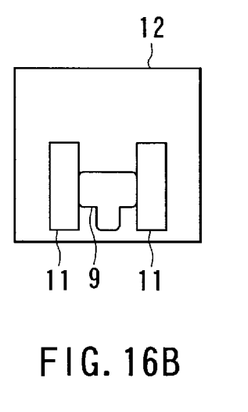

A thin-film magnetic head and a method of manufacturing the same of a third embodiment of the invention will now be described. FIG. 16A and FIG. 16B illustrate the configuration of the thin-film magnetic head of the embodiment. FIG. 16A is a cross section of the head that is taken across the region in which a TMR element is located and that is parallel to the medium facing surface. FIG. 16B illustrates the integrated surface (top surface). The head of the third embodiment incorporates an antiferromagnetic coupling-type multilayer magnetic film 31 in place of the TMR element 20 made up of the lower magnetic layer 3, the tunnel barrier layer 4 and the upper magnetic layer 5. In other words, the thin-film magnetic head of the third embodiment is a CPP-structure GMR head.

Figure 17:
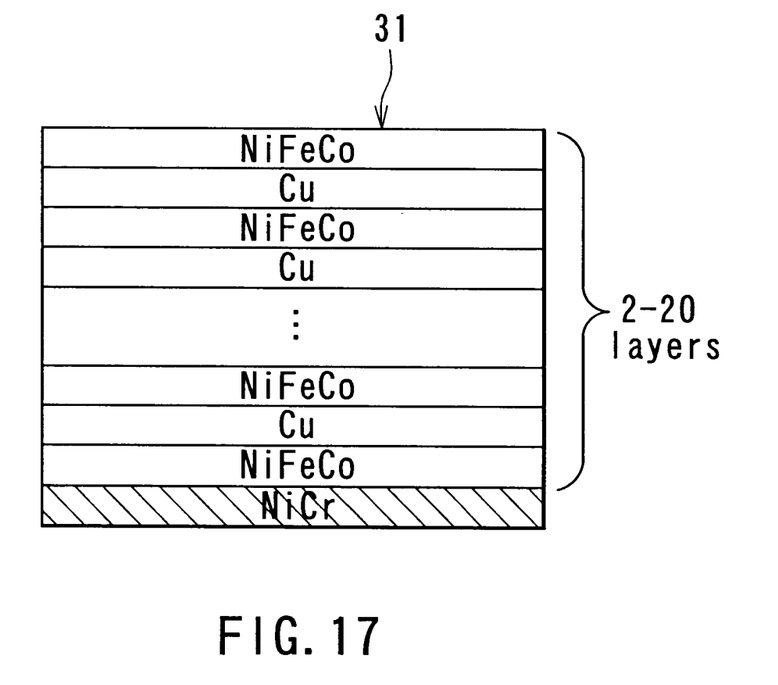
FIG. 17 is a cross-sectional view that illustrates an example of configuration of the antiferromagnetic coupling-type multilayer magnetic film of FIG. 16A and FIG. 16B.

FIG. 17 is a cross-sectional view illustrating an example of configuration of the antiferromagnetic coupling-type multilayer magnetic film 31 of FIG. 16A and FIG. 16B. The multilayer magnetic film 31 of this example is made up of an NiCr layer on which 2 to 20 of NiFeCo layers and Cu layers are alternately stacked.

According to the third embodiment, the FFG layer 9 is not limited to the one made of a soft magnetic material such as NiFe or NiFeTa, but may be an antiferromagnetic coupling-type multilayer magnetic film having a configuration as the one shown in FIG. 16A and FIG. 16B.

According to the third embodiment, a spin-valve multilayer magnetic film may be used in place of the antiferromagnetic coupling-type multilayer magnetic film. This spin-valve multilayer magnetic film may be a dual-spin-valve multilayer magnetic film.

The remainder of the configuration, functions and effects of the third embodiment are similar to those of the first embodiment.

The present invention is not limited to the foregoing embodiments but may be practiced in still other ways. For example, the antiferromagnetic coupling-type multilayer magnetic film 31 of the third embodiment or a spin-valve multilayer magnetic film (including a dual-spin-valve multilayer magnetic film) may be provided in place of the TMR element 20 of the second embodiment that is made up of the lower magnetic layer 3, the tunnel barrier layer 4 and the upper magnetic layer 5.

According to the thin-film magnetic head or the method of manufacturing the same of the invention described so far that relate to the thin-film magnetic head comprising the magnetoresistive element and the soft magnetic layer that introduces a signal flux to the magnetoresistive element, the soft magnetic layer is formed on the base layer that is formed on the insulating layer while the base film is not located between the magnetoresistive element and the soft magnetic layer. As a result, the soft magnetic property of the soft magnetic layer is improved and the output of the head is improved.

Obviously many modifications and variations of the present invention are possible in the light of the above teachings. It is therefore to be a understood that within the scope of the appended claims the invention may be practiced otherwise than as specifically described.

What is claimed is:

1. A thin-film magnetic head comprising:

a magnetoresistive element having two surfaces that face toward opposite directions and a side portion that connects the two surfaces to each other;

a first electrode layer and a second electrode layer each of which is directly or indirectly connected to each of the surfaces of the magnetoresistive element and provided for feeding a current used for signal detection to the magnetoresistive element;

an insulating layer provided between the first and second electrode layers and located adjacent to the side portion of the magnetoresistive element;

a soft magnetic layer introducing a signal magnetic flux to the magnetoresistive element, the soft magnetic layer touching one of the surfaces of the magnetoresistive element and extending from a region in which the magnetoresistive element is located to a region in which the insulating layer is located; and a base film located between the soft magnetic layer and the insulating layer and used as a base when the soft magnetic layer is formed.

2. The thin-film magnetic head according to claim 1 wherein the base film is made of a nonmagnetic metal material.

3. The thin-film magnetic head according to claim 2 wherein the nonmagnetic metal material includes Cr or NiCr.

4. The thin-film magnetic head according to claim 1 wherein the magnetoresistive element incorporates a tunnel barrier layer and two magnetic layers opposed to each other, the tunnel barrier layer being located between the magnetic layers.

5. The thin-film magnetic head according to claim 1 wherein the magnetoresistive element incorporates an antiferromagnetic-coupling-type multilayer magnetic film.

6. The thin-film magnetic head according to claim 1 wherein the magnetoresistive element incorporates a spin-valve-type multilayer magnetic film.

7. The thin-film magnetic head according to claim 1 wherein the soft magnetic layer is made up of a plurality of layers.

8. A method of manufacturing a thin-film magnetic head comprising:

a magnetoresistive element having two surfaces that face toward opposite directions and a side portion that connects the two surfaces to each other;

a first electrode layer and a second electrode layer each of which is directly or indirectly connected to each of the surfaces of the magnetoresistive element and provided for feeding a current used for signal detection to the magnetoresistive element;

an insulating layer provided between the first and second electrode layers and located adjacent to the side portion of the magnetoresistive element; and a soft magnetic layer introducing a signal magnetic flux to the magnetoresistive element, the soft magnetic layer touching one of the surfaces of the magnetoresistive element and extending from a region in which the magnetoresistive element is located to a region in which the insulating layer is located; the method including the steps of:

forming the first electrode layer;

forming the magnetoresistive element and the insulating layer on the first electrode layer;

forming a base film on the insulating layer, the base film being used as a base when the soft magnetic layer is formed;

forming the soft magnetic layer on the base film and the magnetoresistive element; and forming the second electrode layer on the soft magnetic layer.

9. The method according to claim 8 wherein the base film is made of a nonmagnetic metal material.

10. The method according to claim 9 wherein the nonmagnetic metal material includes Cr or NiCr.

11. The method according to claim 8 wherein the magnetoresistive element incorporates a tunnel barrier layer and two magnetic layers opposed to each other, the tunnel barrier layer being located between the magnetic layers.

12. The method according to claim 8 wherein the magnetoresistive element incorporates an antiferromagnetic coupling-type multilayer magnetic film.

13. The method according to claim 8 wherein the magnetoresistive element incorporates a spin-valve-type multilayer magnetic film.

14. The method according to claim 8 wherein the soft magnetic layer is made up of a plurality of layers.

* * * * *